US012711817B2

(12) United States Patent
Sugawara et al.

(10) Patent No.: US 12,711,817 B2
(45) Date of Patent: Aug. 18, 2026

(54) VEHICLE MONITORING DEVICE AND VEHICLE MONITORING METHOD

(71) Applicants: TOYOTA JIDOSHA KABUSHIKI KAISHA, Toyota (JP); DENSO CORPORATION, Kariya-city (JP)

(72) Inventors: Shinnosuke Sugawara, Toyota (JP); Takeshi Matsui, Nagoya (JP); Tokuya Inagaki, Kariya-city (JP); Shogo Watanabe, Kariya-city (JP); Ryosuke Murakami, Kariya-city (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 248 days.

(21) Appl. No.: 18/514,651

(22) Filed: Nov. 20, 2023

(65) Prior Publication Data

US 2024/0177540 A1 May 30, 2024

(30) Foreign Application Priority Data

Nov. 28, 2022 (JP) ................................ 2022-189072

(51) Int. Cl.
*G07C 5/08* (2006.01)

(52) U.S. Cl.
CPC ................................ *G07C 5/0808* (2013.01)

(58) Field of Classification Search
CPC .... G07C 5/0808; G07C 5/008; G07C 5/0841; H04N 7/18
See application file for complete search history.

(56) References Cited

U.S. PATENT DOCUMENTS

| | | | |
|---|---|---|---|
| 2012/0053778 A1 | 3/2012 | Colvin et al. | |
| 2020/0336504 A1 | 10/2020 | Maeda et al. | |
| 2021/0264693 A1* | 8/2021 | Rueck | G07C 5/04 |
| 2022/0103583 A1 | 3/2022 | Torisaki et al. | |
| 2023/0401123 A1 | 12/2023 | Ikushima | |

FOREIGN PATENT DOCUMENTS

| | | |
|---|---|---|
| JP | 2008-009854 A | 1/2008 |
| JP | 2022-055558 A | 4/2022 |
| JP | 2022-135577 A | 9/2022 |
| WO | 2019/193786 A1 | 10/2019 |

* cited by examiner

*Primary Examiner* — Michael V Kerrigan
(74) *Attorney, Agent, or Firm* — Oliff PLC

(57) ABSTRACT

A processor of a vehicle monitoring device obtains log information of an event that has occurred in a vehicle on-board device, determines whether a diagnosis is necessary based on the obtained log information, and transmits a diagnostic data set to an external server when determining that a diagnosis is necessary. The diagnostic data set transmitted to the server by the processor includes log information based on which a diagnosis is determined to be necessary, log information that is obtained prior to the determination, and log information that is obtained after the determination.

8 Claims, 4 Drawing Sheets

VEHICLE MONITORING DEVICE AND VEHICLE MONITORING METHOD

BACKGROUND

1. Field

The present disclosure relates to a vehicle monitoring device mounted on a vehicle and a vehicle monitoring method.

2. Description of Related Art

Japanese Laid-Open Patent Publication No. 2022-55558 discloses a system that functions as a vehicle monitoring device. The vehicle monitoring device of this document obtains log information of an event that has occurred in vehicle on-board devices and determines whether a diagnosis is necessary. The vehicle monitoring device then transmits, to an external server, the log information of an event for which a diagnosis is determined to be necessary. The server diagnoses whether there is an anomaly based on the received log information.

When including anomalies caused by unidentified threats, such as cyberattacks, in the monitoring targets, the server might not be able to accurately diagnose the presence or absence of such anomalies based solely on the log information of events that are suspected of having anomalies.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle monitoring device mounted on a vehicle includes a processor. The processor is configured to obtain log information of an event that has occurred in a vehicle on-board device, determine whether a diagnosis is necessary based on the obtained log information, and transmit a diagnostic data set to an external server when determining that a diagnosis is necessary. The diagnostic data set includes log information based on which a diagnosis is determined to be necessary and log information that is obtained prior to the determination.

In another general aspect, a vehicle monitoring method for monitoring a vehicle on-board device is provided. The method includes: obtaining log information of an event that has occurred in a vehicle on-board device; determining whether a diagnosis is necessary based on the obtained log information; and transmitting a diagnostic data set to an external server when determining that a diagnosis is necessary. The diagnostic data set includes log information based on which a diagnosis is determined to be necessary and log information that is obtained prior to the determination.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A vehicle monitoring device 10 according to a first embodiment will now be described with reference to FIGS. 1 and 2.

Configuration of Vehicle Monitoring Device

Figure 1:
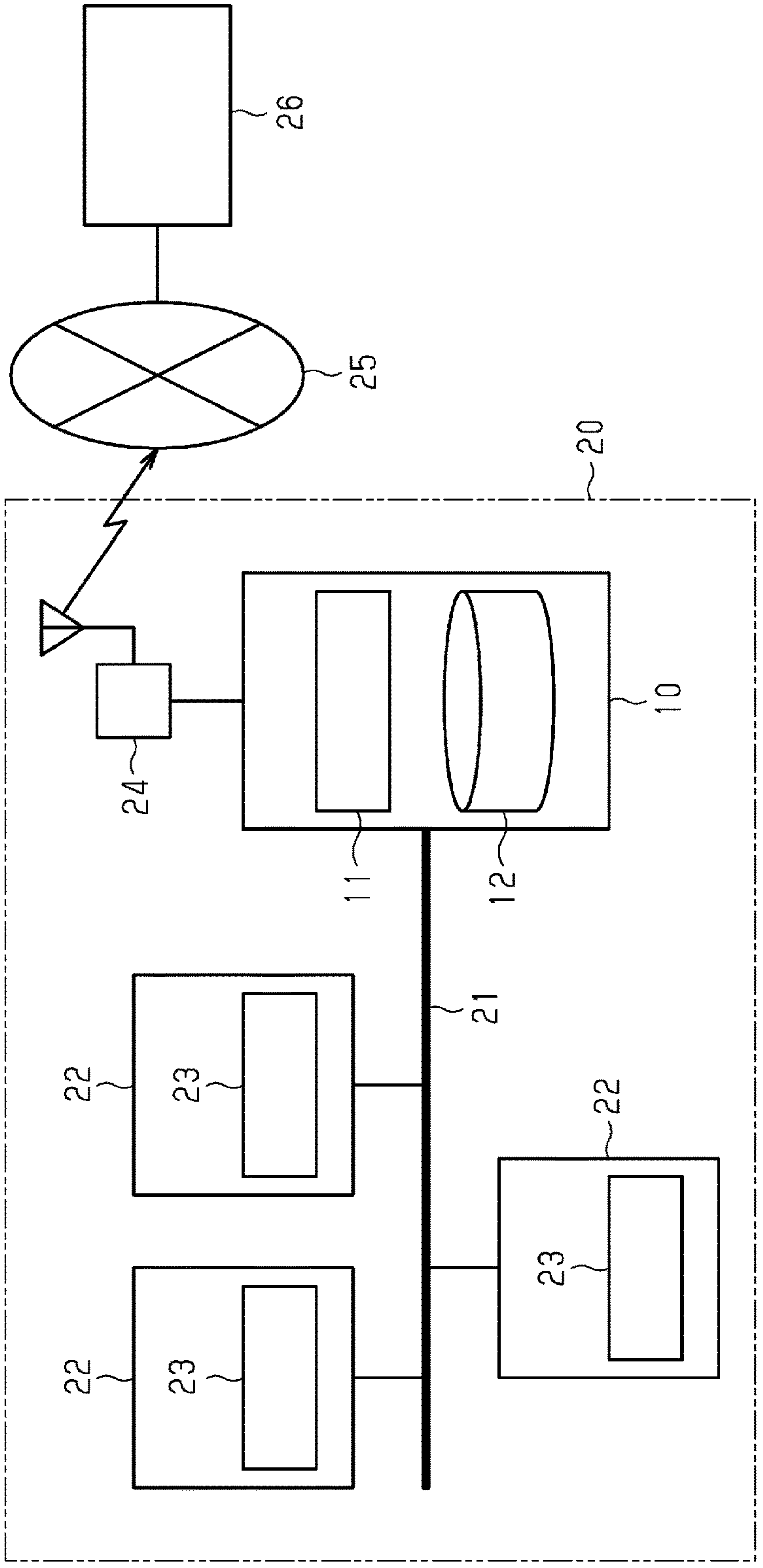
FIG. 1 is a diagram schematically showing a configuration of a vehicle monitoring device according to a first embodiment.

As shown in FIG. 1, the vehicle monitoring device 10 of the present embodiment is mounted on a vehicle 20. The vehicle 20 includes multiple electronic control units 22, which are vehicle on-board devices. The electronic control units 22 are on-board computers of the vehicle 20 and implement specified functions by executing programs. The electronic control units 22 include, for example, an electronic control unit having an engine control function, an electronic control unit having a shift control function, an electronic control unit having a steering control function, and an electronic control unit having a brake control function. Each electronic control unit 22 is connected to a vehicle on-board network 21.

The vehicle monitoring device 10 is connected to the vehicle on-board network 21 and is capable of transmitting and receiving data to and from the electronic control units 22. The vehicle monitoring device 10 includes a processor 11 and a storage 12. The processor 11 executes programs to implement a monitoring function for vehicle on-board devices. The storage 12 is a storage device that stores data used for monitoring.

Each electronic control unit 22 includes a security sensor 23. The security sensor 23 detects the occurrence of an event that is an indication of an anomaly in the electronic control unit 22. When detecting such an event, the security sensor 23 generates log information of the event and sends the log information to the vehicle monitoring device 10. Anomalies include ones generated by cyberattacks from the outside of the vehicle 20. Events include, for example, a process executed by the electronic control unit 22 and access to other vehicle on-board devices or devices outside the vehicle 20. Log information that is sent to the vehicle monitoring device 10 by the security sensor 23 includes information indicating the type of each event.

The vehicle monitoring device 10 is also connected to a wireless communication device 24. The wireless communication device 24 performs wireless communication with devices outside the vehicle 20 through a wireless communication network 25 such as a mobile communications service. The wireless communication device 24 transmits and receives data between a server 26, which is arranged in an external data center, and the vehicle monitoring device 10 through the wireless communication network 25.

Monitoring Operation of Vehicle On-Board Devices

A monitoring operation of the vehicle 20 performed by the vehicle monitoring device 10 will now be described.

Figure 2:
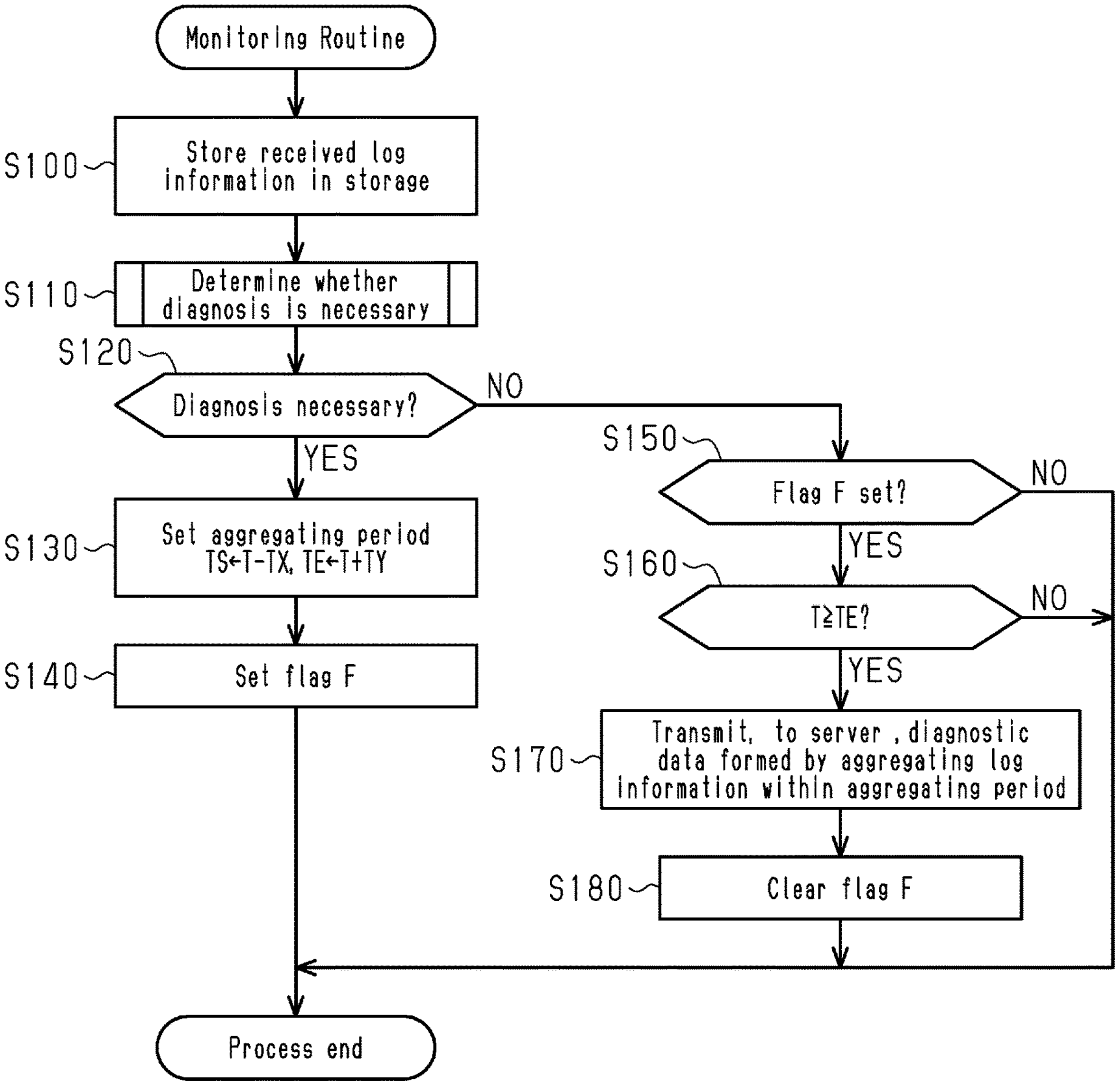
FIG. 2 is a flowchart of a monitoring routine executed by the vehicle monitoring device according to the first embodiment.

FIG. 2 is a flowchart of a monitoring routine executed by the processor 11 of the vehicle monitoring device 10. The processor 11 executes the monitoring routine each time it receives log information from the security sensor 23 of each electronic control unit 22.

When starting this routine, the processor 11 first stores received log information in the storage 12 in step S100. The processor 11 sets serial numbers, which increase in the order of obtainment of log information, as ID numbers that identify pieces of log information. Then, in addition to the log information received from the vehicle on-board devices, the processor 11 stores the ID number and the obtainment time of each piece of the log information in the storage 12.

In the subsequent step S110, the processor 11 determines whether a diagnosis is necessary based on the log information stored in the storage 12. The processor 11 determines that a diagnosis is necessary when an occurrence pattern of an event indicated by the log information stored in the storage 12 agrees with any one of preset patterns.

The processor 11 sets a criterion for determining whether a diagnosis is necessary for each type of event. Cases in which the processor 11 determines that a diagnosis is necessary include the cases listed in the next paragraph, for example. An event A, an event B, an event C, an event D, and an event E, which are shown below, represent different types of events. The event A is, for example, an event that rarely occurs in a normal state. For example, the event B and the event C may occur individually, but rarely occur concurrently in a normal state. The event D and the event E are, for example, events that do not occur at a high frequency in a normal state. In the following description, N indicates a natural number, and M indicates a natural number smaller than N.

- A case in which the log information of the event A is obtained
- A case in which the log information of the event B and the log information of the event C are obtained within a specified time
- A case in which the log information of the event D is obtained a specified number of times or more within a specified time
- A case in which a state in which the log information of the event E is obtained a specified number of times or more within a unit time continues for a prescribed period or longer
- A case in which the log information of events of N types or more is obtained within a specified time
- A case in which a state in which the log information of events of M types or more is obtained continues for a specified time or longer.

When determining that a diagnosis is necessary in step S110 (S120: YES), the processor 11 advances the process to step S130. In step S130, the processor 11 sets a start time TS and an end time TE of a log information aggregating period with reference to the time at which log information based on which a diagnosis is determined to be necessary is obtained, that is, with reference to the current time T. Specifically, the processor 11 sets the value of the start time TS of the aggregating period to a time (T−TX), which is a prescribed time TX before the time T. Also, the processor 11 sets the value of the end time TE of the aggregating period to a time (T+TY), which is a prescribed time TY after the time T. Subsequently, in step S140, the processor 11 sets the flag F, which indicates that it is currently within the log information aggregating period, and then terminates the current processing of the routine. The processor 11 changes the values of the prescribed time TX and the prescribed time TY depending on the occurrence pattern of the event based on which a diagnosis has been determined to be necessary.

When determining that a diagnosis is not necessary in step S120 (S120: NO), the processor 11 advances the process to step S150. In step S150, the processor 11 determines whether the flag F is set, that is, whether it is currently within the log information aggregating period. If the flag F is set (S150: YES), the processor 11 advances the process to step S160. If the flag F is not set (S150: NO), the processor 11 terminates the current processing of the routine.

In step S160, the processor 11 determines whether the current time T is after the end time TE of the aggregating period. If the current time T is after the end time TE of the aggregating period (S160: YES), the processor 11 advances the process to step S170. If the current time T is before the end time TE of the aggregating period (S160: NO), that is, if the current time T is still within the aggregating period, the processor 11 terminates the current processing of the routine.

In step S170, the processor 11 transmits the log information obtained during the aggregating period as an aggregated diagnostic data sent to the server 26. More specifically, the processor 11 extracts, from the log information stored in the storage 12, pieces of log information of which the obtainment time is after the start time TS and before the end time TE. The processor 11 then aggregates the extracted pieces of log information and generates a diagnostic data set. More specifically, the processor 11 transmits, to the server 26, a collection of pieces of log information obtained within the aggregating period, which is a prescribed period. The collection is referred to as a diagnostic data set. Subsequently, after clearing the flag F in step S180, the processor 11 terminates the current processing of the routine.

The server 26 diagnoses whether there is an anomaly in the vehicle 20 or the type of the anomaly based on the received diagnostic data set. The server 26 transmits the result of the diagnosis to the vehicle monitoring device 10. Further, when diagnosing that there is an anomaly, the server 26 may send a notification to the previously registered mobile information terminal or the like of the user of the vehicle 20, with guidance on bringing the vehicle 20 to the dealer.

Operation and Advantages of Embodiment

The vehicle monitoring device 10 includes the processor 11, which executes processes for monitoring the vehicle 20. The processor 11 obtains log information of an event that has occurred in the vehicle on-board devices and determines whether a diagnosis is necessary based on the obtained log information. At this time, the processor 11 determines that a diagnosis is necessary when the occurrence pattern of an event indicated by the obtained log information agrees with any one of the preset patterns.

When determining that a diagnosis is necessary, the processor 11 transmits a diagnostic data set to the external server 26. At this time, in addition to a piece of log information based on which a diagnosis is determined to be necessary, the processor 11 transmits, to the server 26, a collection of pieces of log information obtained in the prescribed period before and after the obtainment of the piece of log information based on which a diagnosis is determined to be necessary, as a diagnostic data set. That is, the diagnostic data set transmitted to the server 26 by the processor 11 includes the log information based on which a diagnosis is determined to be necessary, the log information obtained prior to the determination, and the log information obtained after the determination. The server 26 performs an anomaly diagnosis of the vehicle 20 based on the received diagnostic data set and transmits the result to the vehicle monitoring device 10.

Various types of anomalies occur in the vehicle 20. For known types of anomalies, it is possible to predict the behavior of electronic control units 22 or the like during the anomaly. Therefore, known types of anomalies can be detected if the behavior at the time of such an anomaly is included in the events that are detected by the security sensors 23 and of which the log information is sent to the vehicle monitoring device 10.

On the other hand, in recent years, it has been pointed out that the vehicle 20 may be exposed to cyberattacks from the outside. Since methods of cyberattacks are evolving, there are cases in which the impact on the electronic control unit 22 or the like cannot be known in advance. There are often cases in which the events that occur during anomalies due to such unidentified threats cannot be fully anticipated. However, when an anomaly occurs due to an unidentified threat, the electronic control unit 22 or the like may exhibit behaviors different from their normal operations. Therefore, based on such behaviors as evidence, it is possible to determine that there might be an anomaly. The present embodiment treats behaviors that serve as evidence of anomalies as events for which the security sensor 23 of each electronic control unit 22 sends log information to the vehicle monitoring device 10. The processor 11 determines that a diagnosis is necessary when the occurrence pattern of an event indicated by the obtained log information agrees with any one of the preset patterns. As a result, even in the case of an anomaly due to an unidentified threat, it is highly likely that a diagnosis will be determined to be necessary.

In the case of an anomaly due to an unidentified threat, it is not clear what event occurs at the time of the anomaly. Thus, in some cases, an anomaly diagnosis cannot be properly performed with only the log information of the event for which a diagnosis is determined to be necessary. However, in the vehicle 20 in such a case, an event that is an indication of an anomaly may have occurred before the event for which a diagnosis is determined to be necessary. Thus, in addition to the log information of the event for which a diagnosis is determined to be necessary, the processor 11 includes, in the diagnostic data set to be transmitted to the server 26 for anomaly diagnosis, log information obtained prior to the obtainment of the log information based on which a diagnosis is determined to be necessary. In such a case, an event that is an indication of an anomaly may have occurred after the event for which a diagnosis is determined to be necessary. Thus, the processor 11 includes, in the diagnostic data set, log information obtained after the obtainment of the log information based on which a diagnosis is determined to be necessary. Therefore, in the anomaly diagnosis in the server 26, it is highly likely that an anomaly due to an unidentified threat will be diagnosed.

As described above, when determining that a diagnosis is necessary, the processor 11 transmits, to the server 26, a collection of pieces of log information obtained during the aggregating period, as a diagnostic data set. Depending on the type of anomaly, the anomaly diagnosis in the server 26 may require log information of a long-term event. The occurrence pattern of an event for which a diagnosis is determined to be necessary may include an event that occurred earlier than the point in time at which a diagnosis is finally determined to be necessary. If the log information during a fixed period is generated as a diagnostic data set regardless of the occurrence pattern of an event for which a diagnosis is determined to be necessary, the log information included in the diagnostic data set may be either excessive or insufficient. In this regard, the processor 11 changes the prescribed time TX and the prescribed time TY depending on the occurrence pattern of an event based on which a diagnosis is determined to be necessary. That is, the processor 11 adjusts the aggregating period for log information to be transmitted to the server 26 as a diagnostic data set based on the occurrence pattern of an event for which a diagnosis is determined to be necessary. Thus, the log information used for the diagnosis process in the server 26 is unlikely to become excessive or insufficient.

The vehicle monitoring device 10 of the present embodiment has the following advantages.

(1) The processor 11 of the vehicle monitoring device 10 obtains log information of an event that has occurred in the electronic control units 22 and determines whether a diagnosis is necessary based on the obtained log information. The processor 11 sends a diagnostic data set to the external server 26 when determining that a diagnosis is necessary. The diagnostic data set includes log information based on which a diagnosis is determined to be necessary and log information that is obtained prior to the determination. It may be difficult to diagnose an anomaly caused by an unidentified threat only with log information based on which a diagnosis is determined to be necessary. At the time of an anomaly caused by an unidentified threat, an event that is an indication of the anomaly may have occurred before the obtainment of the log information based on which a diagnosis is determined to be necessary. Therefore, it is highly likely that an anomaly due to an unidentified threat will be diagnosed for its presence and type.

(2) The processor 11 includes, in a diagnostic data set to be transmitted to the server 26, log information obtained after the obtainment of log information based on which a diagnosis is determined to be necessary. At the time of an anomaly caused by an unidentified threat, an event that is an indication of the anomaly may occur after the obtainment of the log information based on which a diagnosis is determined to be necessary. Therefore, it is highly likely that an anomaly due to an unidentified threat will be diagnosed for its presence and type.

(3) With reference to the time of obtainment of log information based on which a diagnosis is determined to be necessary, the processor 11 sets the aggregating period to the period before and after the obtainment. The processor 11 transmits, to the server 26, a collection of pieces of log information obtained in the aggregating period as a diagnostic data set. This allows a diagnostic data set to be generated that includes log information based on which a diagnosis is determined to be necessary and log information obtained before and after the determination.

(4) The processor 11 determines that a diagnosis is necessary when the occurrence pattern of an event indicated by the obtained log information agrees with any one of the preset patterns. The processor 11 adjusts the aggregating period for log information to be transmitted to the server 26 as a diagnostic data set based on the occurrence pattern of an event for which a diagnosis is determined to be necessary. Thus, the log information used for the anomaly diagnosis is unlikely to become excessive or insufficient.

(5) The server 26, which is installed in an external data center, performs an anomaly diagnosis based on the diagnostic data set transmitted by the vehicle monitoring device 10. Therefore, it is possible to perform anomaly diagnosis, which is difficult to perform in the vehicle 20 due to the high load. Furthermore, anomaly diagnosis can be performed based on information that is newly discovered after the manufacture of the vehicle 20.

Second Embodiment

A vehicle monitoring device 10 according to a second embodiment will now be described with reference to FIG. 3. In the present embodiment, like or the same reference numerals are given to those components that are like or the same as the corresponding components of the above-described embodiment, and the detailed description will be omitted. The hardware configuration of the vehicle monitoring device 10 of the present embodiment is common to that of the vehicle monitoring device 10 of the first embodiment shown in FIG. 1.

Monitoring Routine of Second Embodiment

Figure 3:
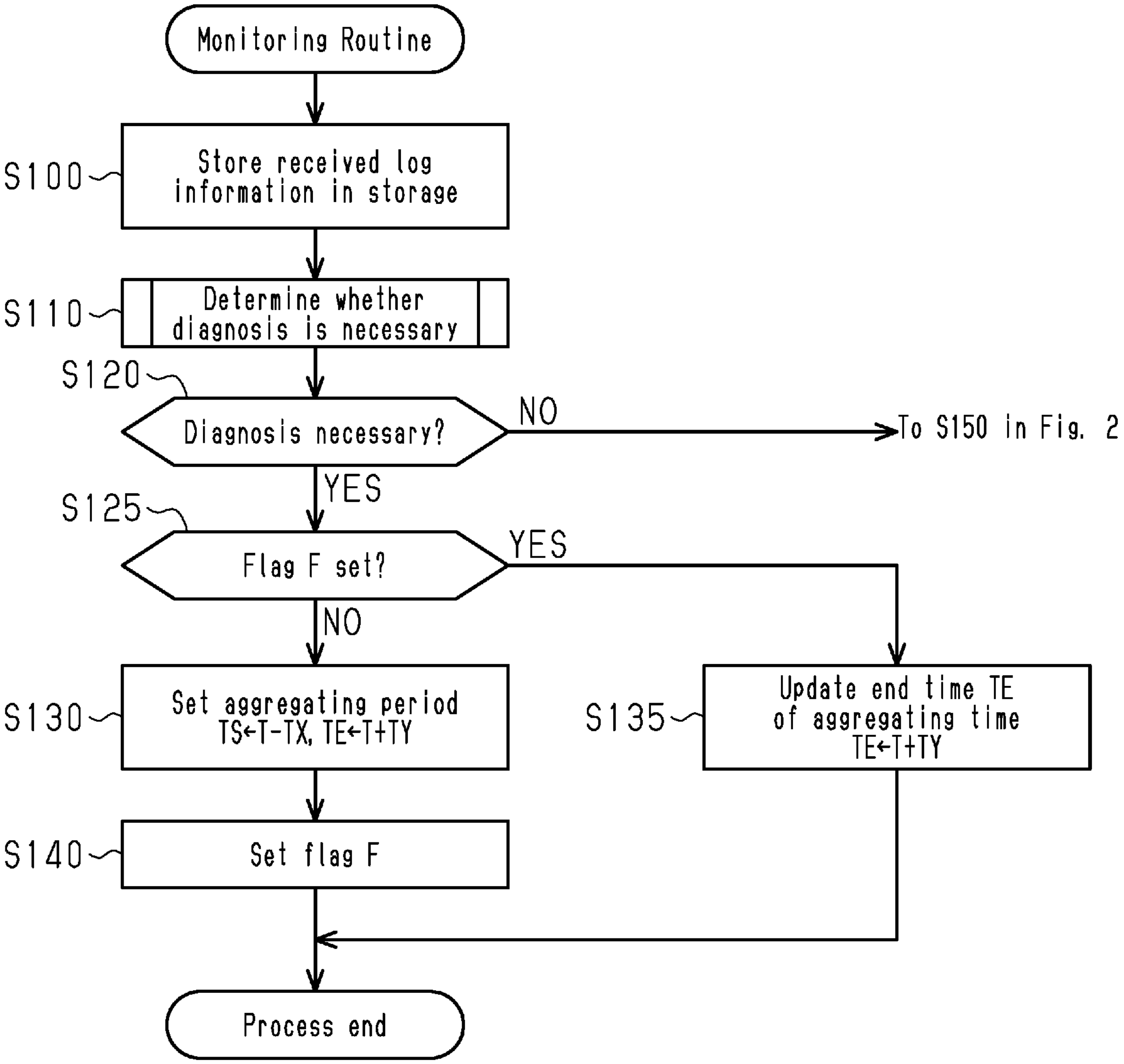
FIG. 3 is a flowchart of a monitoring routine executed by the vehicle monitoring device according to a second embodiment.

FIG. 3 is a flowchart of a monitoring routine executed by the processor 11 of the vehicle monitoring device 10 according to the present embodiment. This routine differs from the routine of FIG. 2 in the processes after a diagnosis is determined to be necessary in step S120. That is, steps S100 to S120 in this routine are the same as those in FIG. 2. In FIG. 3, the processes in the case in which a diagnosis is determined to be not necessary in step S120 (S120: NO) are omitted. In this case, the processes in steps S150 to S180 in FIG. 2 are executed.

In this routine, when determining that a diagnosis is necessary in step S110 (S120: YES), the processor 11 advances the process to step S125. In step S125, the processor 11 determines whether the flag F is set. As described above, the flag F indicates whether it is currently within the aggregating period for log information to be transmitted as a diagnostic data set to server 26. Therefore, the flag F being set indicates that it was previously determined that a diagnosis is necessary before the determination that a diagnosis is necessary in the current cycle, and that it is currently within the log information aggregating period started in response to the previous determination.

When the flag F is not set (S125: NO), the processor 11 sets the start time TS and the end time TE of the log information aggregating period in step S130. Subsequently, in step S140, the processor 11 sets the flag F, which indicates that it is currently within the log information aggregating period, and then terminates the current processing of the routine.

When the flag F is set (S125: NO), the processor 11 sets the end time TE of the log information aggregating period with reference to the current time T in step S135. More specifically, in step S135, the processor 11 sets the value of the end time TE of the aggregating period to a time (T+TY), which is the prescribed time TY after the current time T. Then, the processor 11 terminates the current processing of the routine.

Operation and Advantages of Second Embodiment

In the same manner as in the first embodiment, when determining that a diagnosis is necessary (S120: YES), the processor 11 of the present embodiment transmits, to the server 26, a collection of pieces of log information obtained in a period before and after the determination, as a diagnostic data set. During the aggregating period for log information transmitted to the server 26 as the diagnostic data set, it may be determined that a diagnosis is necessary again. In such a case, the processor 11 may separately transmit a diagnostic data set for each of the two determinations. The diagnostic data set transmitted to the server 26 by the processor 11 in response to the first determination at this time is referred to as a first diagnostic data set. Also, the diagnostic data set transmitted to the server 26 by the processor 11 in response to the second determination is referred to as a second diagnostic data set. At this time, the first diagnostic data set and the second diagnostic data set include overlapping log information.

The two determinations at this time are temporally close, and are highly likely to be due to a common cause. Nevertheless, in the above case, the diagnostic data set is transmitted to the server 26 twice. Also, the two diagnostic data sets include overlapping log information. Therefore, in the above case, the amount of data transmitted to the server 26 increases. In addition, since the server 26 separately performs the anomaly diagnosis on each of the diagnostic data sets, the load on the server 26 also increases.

In contrast, when it is determined that a second diagnosis is necessary during the aggregating period for log information to be included in the first diagnostic data set, the processor 11 of the present embodiment updates the end time TE of the aggregating period based on the obtainment time of the log information related to the determination that the second diagnosis is necessary. That is, the processor 11 changes the end time TE of the aggregating period to a time that corresponds to the second determination, while maintaining the start time TS of the aggregating period at the time set when the first determination was made. As a result, the processor 11 generates a single diagnostic data set by merging the first and second diagnostic data sets, which would be separately transmitted to the server 26 in response to two determinations. The processor 11 then transmits the single diagnostic data set to the server 26. This reduces the number of times of transmission of diagnostic data sets to the server 26. It is also possible to avoid transmission of overlapping log information to the server 26. Therefore, the vehicle monitoring device 10 of the present embodiment suppresses an increase in the amount of data transmitted to the server 26. Further, the number of times of diagnosis performed by the server 26 decreases together with the number of times of transmission of diagnostic data sets. Thus, the vehicle monitoring device 10 of the present embodiment reduces the load on the server 26.

OTHER EMBODIMENTS

The above-described embodiments may be modified as follows. The above-described embodiments and the following modifications can be combined as long as the combined modifications remain technically consistent with each other.

Method for Aggregating Log Information for Diagnostic Data Sets

In the above-described embodiments, the processor 11 sets the aggregating period to the prescribed period before and after the obtainment of log information based on which a diagnosis is determined to be necessary, with reference to the time of the obtainment. The processor 11 transmits, to the server 26, a collection of pieces of log information obtained in the aggregating period as a diagnostic data set. The processor 11 may transmit, to the server 26, a collection of a prescribed number of pieces of log information in which the order of the occurrence of events is contiguous, as the diagnostic data set. That is, the amount of log information to be transmitted to the server 26 as the diagnostic data set may be defined by the number of pieces of log information instead of the period during which the log information is obtained.

Figure 4:
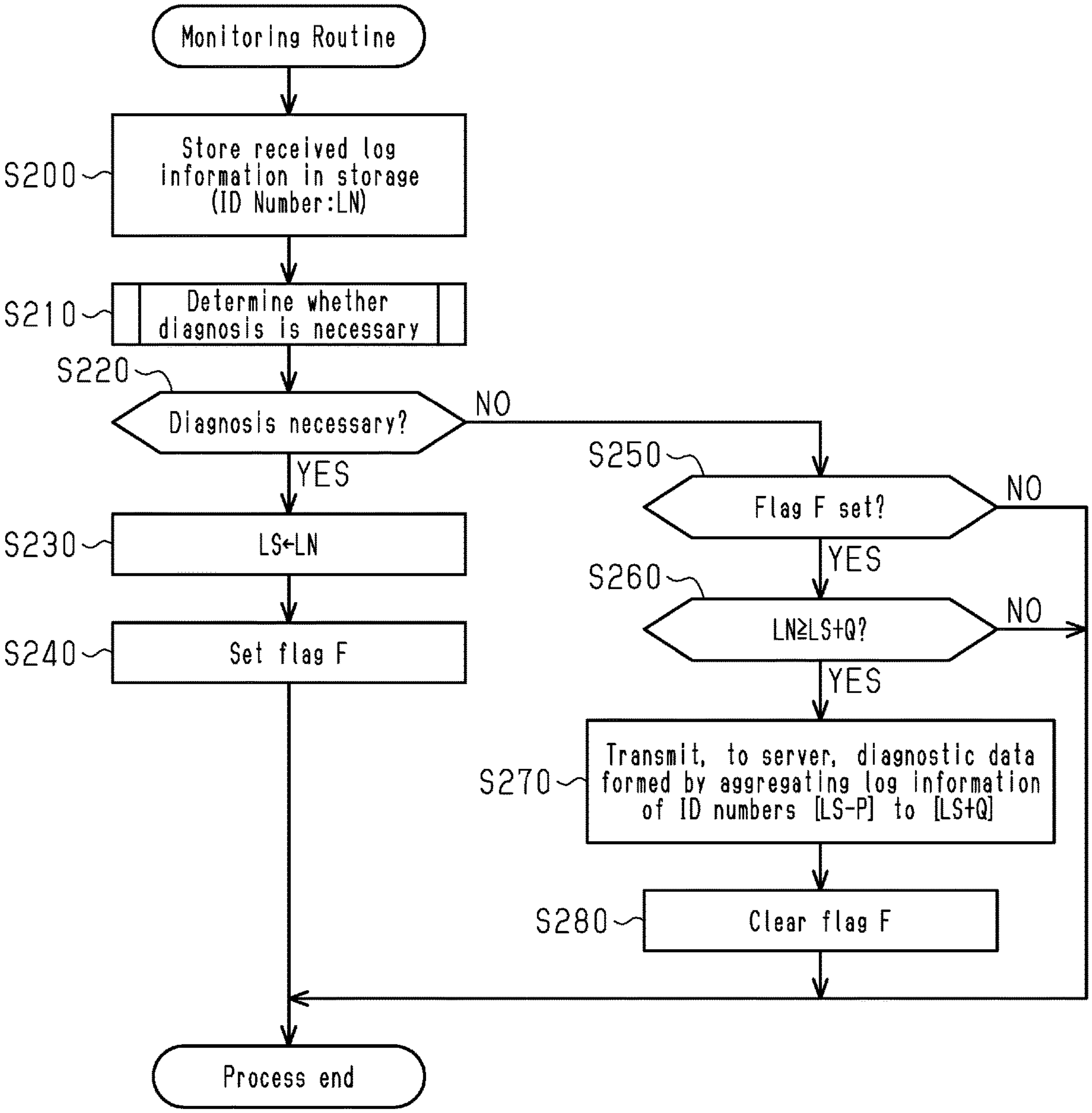
FIG. 4 is a flowchart of a monitoring routine executed by a vehicle monitoring device according to a modification.

FIG. 4 shows a modification of the monitoring routine of FIG. 2. Like the routine of FIG. 2, the processor 11 executes the routine each time it receives log information. In the routine of FIG. 4, when determining that a diagnosis is necessary, the processor 11 transmits, as a diagnostic data set, a collection of a piece of log information based on which a diagnosis is determined to be necessary, P pieces of log information that are obtained prior to the determination, and Q pieces of log information that are obtained after the determination, to the server 26 (P and Q are integers).

When starting this routine, the processor 11 stores the received log information in the storage 12 in step S200. At this time, the processor 11 stores the received pieces of log information in the storage 12 together with ID numbers, which are serial numbers that increase in the order of the obtainment. In the following description, the ID number of the log information that is stored during the execution of the current routine is referred to as a latest log number LN.

In the subsequent step S210, the processor 11 determines whether a diagnosis is necessary based on the log information stored in the storage 12. When determining that a diagnosis is necessary (S220: YES), the processor 11 advances the process to step S230. In step S230, the processor 11 sets the new latest log number LN as the value of a reference log number LS. Subsequently, after setting the flag F in step S240, the processor 11 terminates the current processing of the routine.

When determining that a diagnosis is not necessary in step S220 (S220: NO), the processor 11 advances the process to step S250. In step S250, the processor 11 determines whether the flag F is set. If the flag F is not set (S250: NO), the processor 11 terminates the current processing of the routine.

If the flag F is set (S250: YES), the processor 11 advances the process to step S260. In step S260, the processor 11 adds Q to the reference log number LS, and determines whether the latest log number LN is greater than or equal to the value obtained through the addition (LN≥LS+Q). When the latest log number LN is less than the calculated value (S260: NO), the processor 11 terminates the current processing of the routine.

If an affirmative determination is made in step S260 (S260: YES), the processor 11 extracts pieces of log information with ID numbers from LS−P to LS+Q from the storage 12 in step S270. Further, in step S270, the processor 11 transmits the collection of the extracted pieces of log information as a diagnostic data set to the server 26. Then, after clearing the flag F in step S280, the processor 11 terminates the current processing of the routine.

The monitoring routine of FIG. 3 may be changed in the same manner. For example, step S130 and step S135 of FIG. 3 may each be replaced with step S230 of FIG. 4. When determining that a diagnosis is not necessary in step S120 of FIG. 3 (S120: NO), the process is advanced to step S250 of FIG. 4.

In such a case, the processor 11 may change the values of P and Q in accordance with the occurrence pattern of an event for which a diagnosis is determined to be necessary. In such a case, as in the case of changing the values TX and TY in the above-described embodiments, the log information used for an anomaly diagnosis are unlikely to become excessive or insufficient.

Aggregation Range of Log Information for Diagnostic Data Set

The processor 11 does not necessarily include log information obtained after determination that a diagnosis is necessary in the log information included in the diagnostic data set. That is, the processor 11 may transmit, to the server 26, log information based on which a diagnosis is determined to be necessary and log information obtained before the determination as a diagnosis data set.

The log information aggregating period and the number of pieces of log information transmitted by the processor 11 to the server 26 as a diagnosis data set may be a fixed period and a fixed number regardless of the occurrence pattern of the event for which a diagnosis is determined to be necessary.

OTHER MODIFICATIONS

The vehicle on-board devices other than the electronic control units 22 may be included in the monitoring targets of the vehicle monitoring device 10. For example, a vehicle on-board infotainment device, which provides information or entertainment to occupants through images, sound, or the like, a data relay device installed in the vehicle on-board network 21, or the like may be included in the vehicle on-board devices to be monitored by the vehicle monitoring device 10.

The processes after log information is stored in the storage 12 in the monitoring routine of FIGS. 2 to 4 may be collectively performed as a batch process at a prescribed time instead of being sequentially executed each time log information is received. That is, the processor 11 may execute the process of storing the received log information in the storage 12 (S100 in FIGS. 2 and 3 and S200 in FIG. 4) as a process of the monitoring routine until the prescribed time is reached. Then, at the prescribed time, the processor 11 sequentially executes the processes after the determination for necessity of a diagnosis (S120 in FIGS. 2 and 3, S220 in FIG. 4) in FIGS. 2 to 4 for each piece of the log information stored in the storage 12.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A vehicle monitoring device mounted on a vehicle, the device comprising a processor configured to obtain log information of an event that has occurred in a vehicle on-board device, determine whether diagnosis of an anomaly in the vehicle is necessary based on the obtained log information, transmit a diagnostic data set to an external server when determining that the diagnosis is necessary, and receive a result of the diagnosis from the external server, wherein the diagnostic data set includes log information based on which the diagnosis is determined to be necessary and log information that is obtained prior to the determination.

2. The vehicle monitoring device according to claim 1, wherein the diagnostic data set includes log information that is obtained after the diagnosis is determined to be necessary.

3. The vehicle monitoring device according to claim 2, wherein the processor is further configured such that, when (i) a determination that the diagnosis is necessary has been made twice and (ii) a first diagnostic data set to be transmitted to the server in response to a first determination and a second diagnostic data set to be transmitted to the server in response to a second determination contain overlapping log information, the processor transmits, to the server, a single diagnostic data set obtained by merging the first diagnostic data set and the second diagnostic data set.

4. The vehicle monitoring device according to claim 1, wherein the diagnostic data set is a collection of pieces of log information obtained within a prescribed period, the prescribed period being set with reference to a time at which the log information, based on which the diagnosis is determined to be necessary, is obtained.

5. The vehicle monitoring device according to claim 4, wherein the processor is further configured to determine that the diagnosis is necessary when an occurrence pattern of an event indicated by the obtained log information agrees with any one of preset patterns, and change the prescribed period in accordance with the agreed occurrence pattern.

6. The vehicle monitoring device according to claim 1, wherein the diagnostic data set is a collection of a prescribed number of pieces of log information in which the order of occurrence of events is contiguous.

7. The vehicle monitoring device according to claim 6, wherein the processor is configured to determine that the diagnosis is necessary when an occurrence pattern of an event indicated by the obtained log information agrees with any one of preset patterns, and change the prescribed number in accordance with the agreed occurrence pattern.

8. A vehicle monitoring method for monitoring a vehicle on-board device, the method comprising:

obtaining log information of an event that has occurred in the vehicle on-board device;

determining whether diagnosis of an anomaly in the vehicle is necessary based on the obtained log information;

transmitting a diagnostic data set to an external server when determining that the diagnosis is necessary; and receiving a result of the diagnosis from the external server, wherein the diagnostic data set includes log information based on which the diagnosis is determined to be necessary and log information that is obtained prior to the determination.

* * * * *